Figure 1:
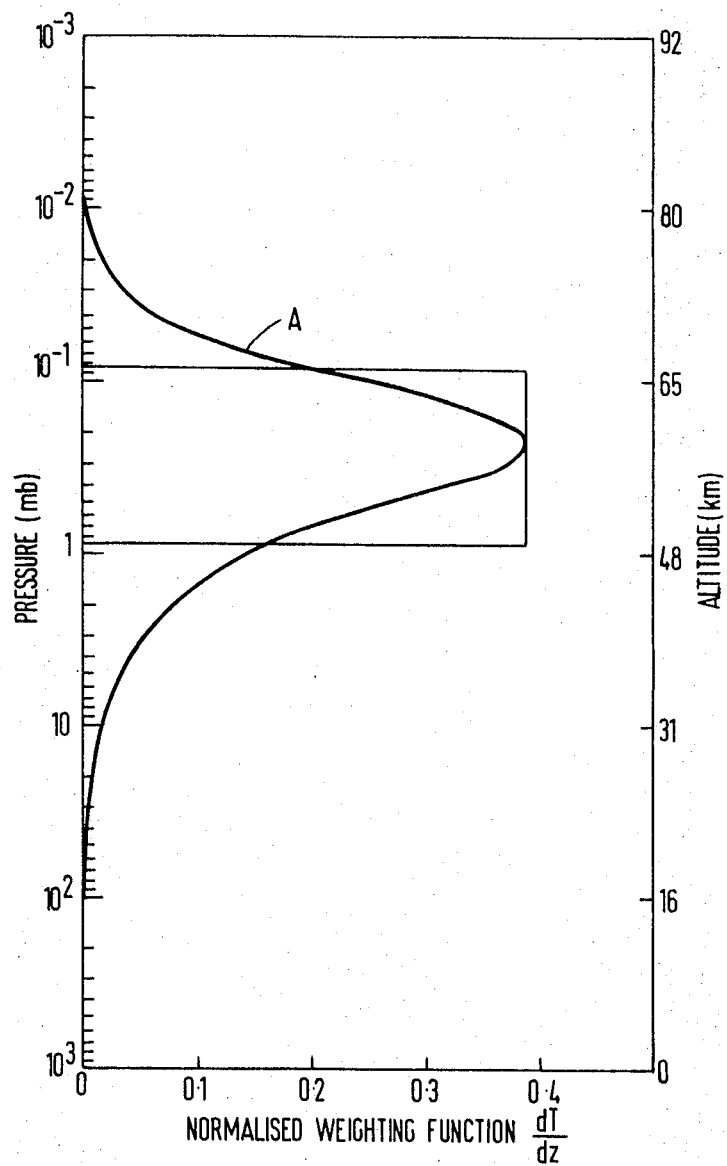

United States Patent

[11] 3,617,737

| [72] | Inventors | John Theodore Houghton;<br>Guy Denton Peskett; Clive Douglas Rodgers; Fredric William Taylor, all of Oxford, England |
|---|---|---|
| [21] | Appl. No. | 840,194 |
| [22] | Filed | July 9, 1969 |
| [45] | Patented | Nov. 2, 1971 |
| [73] | Assignee | National Research Development Corporation<br>London, England |

[54] RADIOMETER APPARATUS COMPRISING A VOLUME OF GAS WHOSE PRESSURE IS CYCLICALLY VARIED
13 Claims, 4 Drawing Figs.

[52] U.S. Cl. .................................................. 250/43.5 R, 250/83.3 H, 73/355
[51] Int. Cl. .................................................. G01n 21/26, G01j 5/10
[50] Field of Search .................................................. 250/43.5, 83.3 IR

[56] References Cited
UNITED STATES PATENTS

| 2,806,957 | 9/1957 | McDonald | 250/43.5 |
| 2,844,066 | 7/1958 | Friel | 250/43.5 |
| 2,930,893 | 3/1960 | Carpenter | 250/43.5 |
| 3,005,097 | 10/1961 | Hummel | 250/43.5 |
| 3,317,730 | 5/1967 | Hilsum | 250/43.5 |

Primary Examiner—James W. Lawrence
Assistant Examiner—C. E. Church
Attorney—Cushman, Darby & Cushman ABSTRACT: The invention concerns apparatus for detecting radiation emitted from a quantity of gas, said apparatus comprising a chamber containing a predetermined amount of a given component of said gas having absorption lines in a band of the emission spectrum, means for cyclically varying the pressure of said component in said chamber, and detector means adapted to provide an output signal which is dependent on the radiation intensity wavelengths of the absorption lines or at predetermined wavelengths in the region thereof, said wavelengths being such that the absorption coefficients of the gas at all detected wavelengths are substantially the same, and the radiation is known to originate predominantly from a particular region of the said quantity of gas.

RADIOMETER APPARATUS COMPRISING A VOLUME OF GAS WHOSE PRESSURE IS CYCLICALLY VARIED

The invention concerns radiometer apparatus.

According to the present invention there is provided apparatus for detecting radiation emitted from a quantity of gas, said apparatus comprising a chamber containing a fixed mass of a single component of said gas having absorption lines in a band of its emission spectrum, the chamber having entry and exit windows defining a single optical path for the passage through the chamber of radiation received from said quantity of gas, means for cyclically varying the pressure of said component in said chamber independently of the intensity of the received radiation, and detector means directly responsive to the intensity of radiation emerging from said chamber via said exit window at wavelengths in the region of said absorption lines, the detector means providing an output signal indicative of a parameter, such as temperature, of said quantity of gas. In one arrangement said means for cyclically varying the pressure of said component comprises a piston arrangement adapted to vary the volume of a part of the chamber through which said radiation passes. Thus said piston arrangement may be oscillated by means of an electromagnet or electromagnets.

Means may be provided to detect the oscillations of said piston arrangement.

Preferably the signal from said means from detecting the oscillations of said piston arrangement are fed to said electromagnet or electromagnets to make a closed loop which governs the oscillations of said piston arrangement, In an alternative arrangement said means for cyclically varying the pressure of said component comprises a ball bearing adapted to fit into a part of said chamber, oscillations of said ball bearing varying the volume of a part of the chamber through which said radiation passes. The said ball bearing may be oscillated by means of an electromagnet or electromagnets.

In one application of the present invention apparatus is adapted to be mounted above the emitting regions of an atmosphere and to receive radiation in a relatively large solid angle from a quantity of gas directly beneath the apparatus and the detected wavelengths of the emitted radiation being so chosen that the radiation is known to originate predominantly in a predetermined atmospheric level.

An inclined mirror may be provided and is movable between a position in which it directs a reference radiation into the chamber and a position in which it allows the radiation emitted from a predetermined region of the atmosphere to enter the chamber.

Preferably the given component of said atmosphere is either carbon dioxide $C^{12}O_2^{16}$ or carbon dioxide $C^{13}O_2^{16}$, or may be any other gas having a suitable absorption band lying in the infrared region of the spectrum.

According to another aspect of the present invention there is provided a method of detecting radiation emitted from a quantity of gas comprising the steps of directing said radiation into a chamber containing a fixed mass of a single component of said gas having absorption lines in a band of its emission spectrum, the chamber having entry and exit windows defining a single optical path along which the radiation received from said quantity of gas passes, cyclically varying the pressure of said component in said chamber independently of the intensity of the received radiation, defecting the intensity of radiation emerging from said chamber via said exit window at wavelengths in the region of said absorption lines providing an output signal indicative of a parameter, such as temperature, of said quantity of gas.

Figure 2:
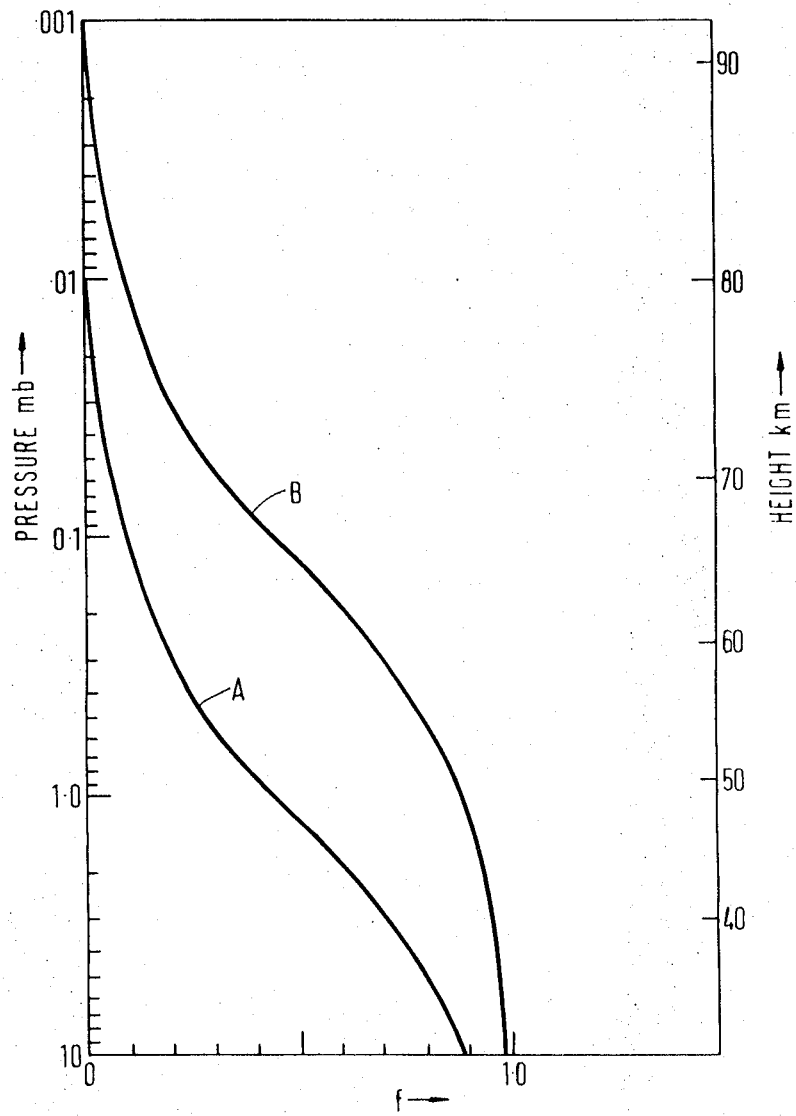
Figure 3:
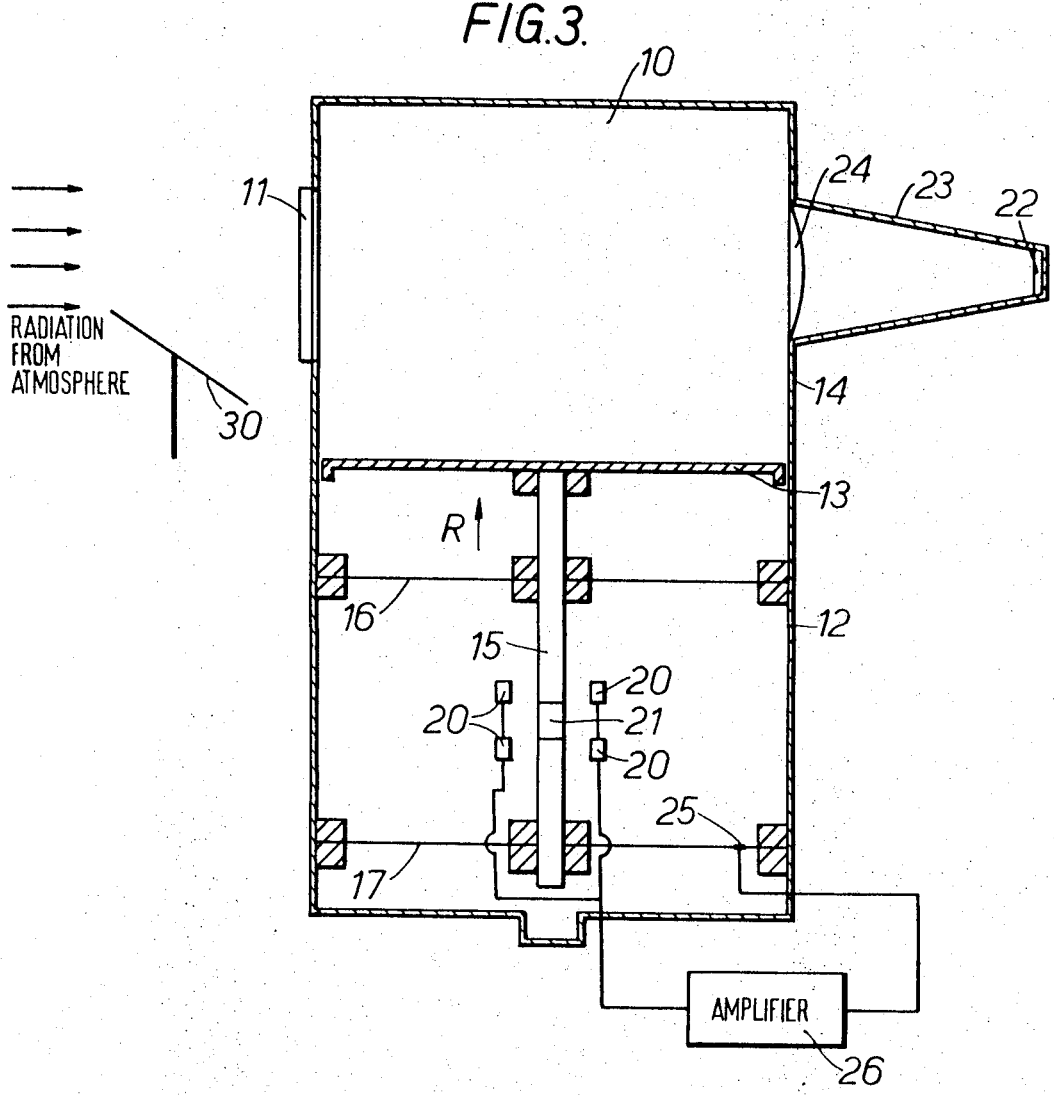
Figure 4:
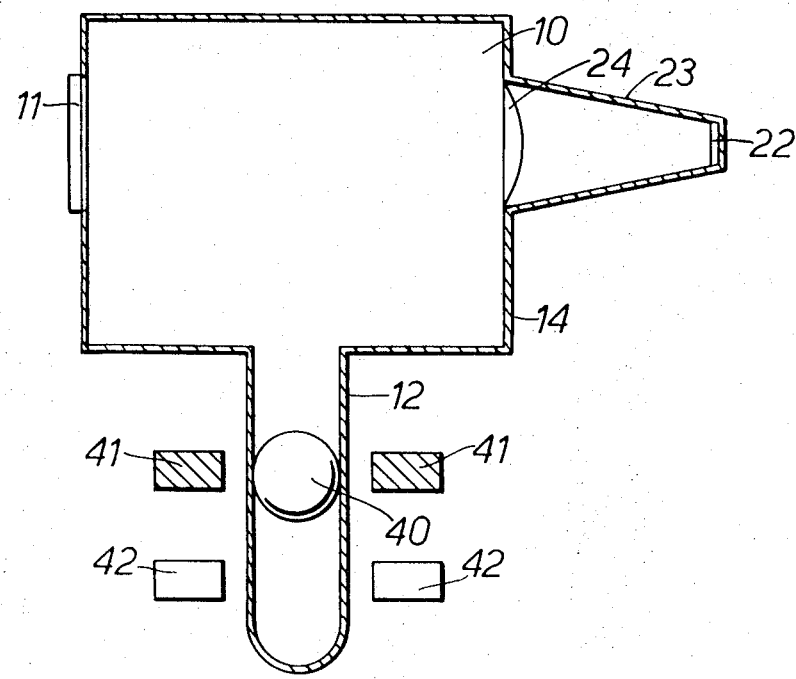

The invention will be more particularly described, by way of example only, with reference to the accompanying drawings, in which:

FIG. 1 illustrates graphically height resolution obtainable with one embodiment of the invention, FIG. 2 illustrates graphically the deviation of the detected radiation intensity from that predicted by the Planck Radiation Law for the case of thermodynamic equilibrium, as a function of height in the terrestrial atmosphere, FIG. 3 illustrates diagrammatically apparatus according to one embodiment of the present invention, and FIG. 4 illustrates diagrammatically apparatus according to a further embodiment of the present invention.

The invention will be described with particular reference to its application to the vertical resolution of radiation emitted by an atmosphere, that is, the discrimination of different emitting layers or levels in an atmosphere. It will be supposed that the radiation emitted by the atmosphere is detected at a station disposed above the emitting layers. This, if the atmosphere is the terrestrial atmosphere, may be mounted in a balloon or satellite above the atmosphere.

Thermal emission of radiation from the atmosphere takes place in the radio, microwave and infrared regions of the spectrum. The most likely object in measuring the intensity of radiation emitted from different levels in the atmosphere is to determine the radiating temperature of the emitting regions. For this purpose it is most useful to examine the infrared emission.

Because, in practice, it is not possible to detect monochromatic frequencies, because a minimum incident energy is required at the detector to give sufficient measuring accuracy U.S. Pat. No. 3,498,132 proposes passing the incident radiation received from the atmosphere through a predetermined absorbing path of the emitting component, in this case carbon dioxide, before the radiation enters the detector. To observe radiation originating from higher atmospheric levels the incident radiation is passed alternately, by using a chopping technique, through a first absorption chamber containing a predetermined quantity of carbon dioxide and a second chamber which is evacuated or contains a different predetermined quantity of carbon dioxide, the detector being tuned to the chopping frequency.

In principle, still higher levels can be monitored by this chopping technique by reducing the path length pressure of carbon dioxide in the absorption chambers. However, there is a limit to this in practice because the precision required of the balance between the transmission of the optical components in each of the alternate optical paths becomes higher.

To avoid this disadvantage the present invention employs a pressure modulated chopping technique i.e., by using one optical path in which only the amount of carbon dioxide is varied. For monochromatic radiation having a clearly defined atmospheric absorption coefficient $k$, it is possible to derive theoretically the height distribution of the origin of the radiation emitted by a given atmospheric component. The height distribution of the origin of the infrared radiation emitted by atmospheric carbon dioxide and measured by the present invention is illustrated in FIG. 1 by curve A which represents graphically a "weighting function" $dT/dz$, where $T$ is the transmission of the atmosphere for a given spectral region between the height $z$ and the top of the atmosphere. The curve A has a maximum at a height of about 60 kilometers. The height at which the maximum occurs is a function of the absorption coefficient $k$ at the particular frequency of the radiation, but the width of the maximum is substantially independent of the absorption coefficient and is approximately 15 kilometers in height units.

The technique of pressure modulated chopping will be illustrated with reference to the examination of infrared radiation emitted by carbon dioxide in the atmosphere, in which case carbon dioxide is used as the absorbing component. It will be appreciated, however, that the technique is applicable to the examination of radiation from any other component of the atmosphere such, for example, as oxygen, ozone, methane or water vapor.

FIG. 2 illustrates the fraction $f$ of the emission of infrared radiation from two species carbon dioxide, $C^{12}O_2^{16}$ and $C^{13}O_2^{16}$, in the atmosphere, compared with that from a black body at the same temperature. In order to infer atmospheric temperature, it is necessary to assume that the atmospheric emission can be described by the Planck black body radiation law. This, of course, in effect is assuming that local thermodynamic equilibrium exists and that the relaxation time for deactivation of the appropriate molecular vibration by collisions must be shorter than the radiative lifetime of the vibration. Since the collision relaxation time depends directly on the pressure the assumption of thermodynamic equilibrium will fail above some altitude. For the $\nu_2$ band of carbon dioxide at $15\mu$ the critical level is about 80 kilometers and the effect is thus not important. However, in the $\nu_3$ band at $4.3\mu$ the collision relaxation time is very much longer than in the $\nu_2$ band. This is because the energy of the $\nu_3$ vibration is much larger than the thermal energies and vibrational relaxation occurs through a complicated chain via the vibrations of nitrogen and oxygen. FIG. 2 shows an estimate of the ratio of the actual source function to the black body function in this band for $C^{12}O_2^{16}$ (graph B) and for the rarer $C^{13}O_2^{16}$ (graph A) molecules. Substantial deviations from unity occur in the former above about 40 kilometers, and in the latter, which makes up about 1 percent of the total carbon dioxide concentration, above 25 kilometers.

A simultaneous measurement of the radiation emitted in the $\nu_2$ and $\nu_3$ bands of carbon dioxide are useful in assessing the contribution to atmospheric heating due to the absorption of solar radiation by carbon dioxide in the upper mesosphere.

A practical embodiment of radiometer apparatus according to the present invention is illustrated diagrammatically in FIG. 3. This apparatus is designed to be mounted on a weather-monitoring satellite and comprises a channel which measures the radiation originating at a predetermined atmospheric level, as described above, to enable the vertical temperature of the atmosphere to be deduced. It will be appreciated that a plurality of such radiometer apparatuses may be put together so as to be responsive to radiation at different levels.

A single radiometer 10 is illustrated in FIG. 3, infrared radiation entering the radiometer through a window 11 which is an interference filter. In one practical example of the radiometer the window 11 had a diameter of 1 inch.

The cell 10 contains carbon dioxide and, if working in the $15\mu$ region, the carbon dioxide is $C^{12}O_2^{16}$. In the lower part 12 of the cell 10 is a piston 13 which is adapted to oscillate in the direction of the arrow R thus causing a corresponding variation of the pressure in the upper part 14 of the cell 10.

The piston 13 has a shank 15 which is supported from the walls of the chamber 10 by means of two resilient spiders 16 and 17 respectively.

The piston 13 is oscillated by means of electromagnets 20 acting on a drive magnet 21 mounted integral with the shank 15 of the piston.

In the upper part 14 of the radiometer and receiving radiation which has passed through the window 11 and the carbon dioxide in the cell 10 is a detector 22 mounted at the end of a light pipe 23, radiation being directed on to the detector by a germanium lens 24 and the light pipe 23.

In the one practical example of the radiometer the detector 22 was so arranged as to give a field of view of 10°. The two resilient spider springs 16, 17 were of beryllium copper and allowed the piston 13 to be oscillated at a maximum amplitude of 1.5 cm. The clearance between the piston 13 and the walls of the cell 10 was less than 0.005 inches to minimize leakage of carbon dioxide between the upper part 14 and the lower part 12 of the cell 10. The resonant frequency of the piston 13 and spider springs 16, 17 was made 15 c.p.s. at which frequency and with cell pressures of the order of 1 mb. the pressure changes were substantially isothermal. The detector 22 is tuned to the resonant frequency of the piston. Oscillations of the piston are maintained and stabilized in amplitude by a feedback loop comprising a PZT ceramic amplitude sensor 25, an amplifier 26 and the electromagnets 20.

The signal produced by the detector 22 is amplified by means of amplifiers (not shown) before being recorded, displayed or being otherwise employed. It will be appreciated that the signal from the detector has to be tuned to the frequency of oscillation of the piston 13 during the amplification of the signal.

The radiometer is calibrated periodically by directing into the cell 10 radiation originating from space or from a local black body (not shown) by a mirror 30. When it is required to calibrate the radiometer the mirror 30 is moved into the line of view of the detector by means (not shown) such as an electric motor or a hydraulic system.

The detector 22 may be a thermistor bolometer of an InSb photoconductive cell or photoconducting mercury, cadmium or tellurium or a pyroelectric device.

In FIG. 4 there is shown an alternative radiometer in which like parts with FIG. 3 have been given like reference numerals. It will be seen that the upper part 14 of the cell 10 is substantially wider than the lower part 12. In the lower part and centrally disposed is a ball bearing 40 kept in place by permanent magnets 41. The ball bearing 40 is oscillated by means of electromagnets 42 which may be driven by suitable means (not shown) as will be apparent to those skilled in the art.

To operate the radiometer in the lower regions of the earth's atmosphere, e.g., from a balloon, then the cell 10 is filled with the rarer isotope $C^{13}O_2^{16}$ of carbon dioxide. Since pure $C^{13}O_2^{16}$ is not available, the purest possible is used and a filter (not shown) consisting of a cell containing $C^{12}O_2^{16}$ is provided to remove the signal due to unwanted $C^{12}O_2^{16}$ in the cell 10. The atmosphere has a greater transparency at the emission wavelengths of $C^{13}O_2^{16}$ than those of $C^{12}O_2^{16}$ due to the greater scarcity of the former, and so the use of $C^{13}O_2^{16}$ in the cell would enable the radiometer to receive radiation from greater distances.

We claim:

1. Apparatus for detecting received radiation emitted from a quantity of gas, said apparatus comprising:
   a chamber,
   a fixed mass of a single component of said gas having absorption lines in a band of its emission spectrum,
   means for directing said radiation to the chamber,
   said chamber having entry and exit windows defining a single optical path for the passage through the chamber of said received radiation from said quantity of gas,
   means for cyclically varying the pressure of said component in said chamber independently of the intensity of the received radiation, and
   detector means for providing an output signal in response to the intensity of radiation emerging from said chamber via said exit window at wavelengths in the region of said absorption lines, said output signal being indicative of a parameter of said quantity of gas.

2. Apparatus as claimed in claim 1 in which said means for cyclically varying the pressure of said component comprises a piston arrangement adapted to vary the volume of a part of the chamber through which said radiation passes.

3. Apparatus as claimed in claim 2 in which said piston arrangement is oscillated by means of at least one electromagnet.

4. Apparatus as claimed in claim 3 in which means are provided to detect the oscillations of said piston arrangement.

5. Apparatus as claimed in claim 4 in which the signals from said means for detecting the oscillations of said piston arrangement are fed to said electromagnet to make a closed loop which governs the oscillations of said piston arrangement.

6. Apparatus as claimed in claim 1 in which said means for cyclically varying the pressure of said component comprises a ball bearing adapted to fit into a part of said chamber, oscillations of said ball bearing varying the volume of a part of the chamber through which said radiation passes.

7. Apparatus as claimed in claim 6 in which said ball bearing is oscillated by means of at least one electromagnet.

8. Apparatus as in claim 1 in which the apparatus is constructed for mounting above the emitting regions of an atmosphere and for receiving radiation in a relatively large solid angle from a quantity of gas directly beneath the apparatus, the detected wavelengths of the emitted radiation being chosen to insure that the radiation originates predominantly in a predetermined atmospheric level.

9. Apparatus as in claim 1 in which an inclined mirror is provided and is movable between a position in which it directs a reference radiation into the chamber and another position in which it allows the radiation emitted from a predetermined region of the atmosphere to enter the chamber.

10. A method of detecting received radiation emitted from a quantity of gas, said method comprising the steps of:
  directing said received radiation into a chamber containing a fixed mass of a single component of said gas having absorption lines in a band of its emission spectrum, the chamber having entry and exit windows defining a single optical path along which said received radiation from said quantity of gas passes,
  cyclically varying the pressure of said component in said chamber independently of the intensity of the received radiation,
  detecting the intensity of radiation emerging from said chamber via said exit window at wavelengths in the region of said absorption lines to provide an output signal indicative of a parameter of said quantity of gas.

11. An apparatus as in claim 1 in which said component of said gas is carbon dioxide $C^{12}O_2^{16}$.

12. An apparatus as in claim 1 wherein said component of said gas is carbon dioxide $C^{13}O_2^{16}$.

13. An apparatus as in claim 1 wherein said detector means is directly responsive to the intensity of radiation emerging from said chamber via said exit window at the wavelengths of the absorption lines.

* * * * *